United States Patent [19]

Wilson et al.

[11] Patent Number: 4,678,618
[45] Date of Patent: Jul. 7, 1987

[54] INDIVIDUAL SOURCE POSITIONING MECHANISM FOR A NUCLEAR REACTOR FUEL ASSEMBLY

[75] Inventors: John F. Wilson, Murrysville Boro; Robert K. Gjertsen, Monroeville Boro; Samuel Cerni, Churchill Boro, all of Pa.

[73] Assignee: Westinghouse Electric Corp., Pittsburgh, Pa.

[21] Appl. No.: 642,607

[22] Filed: Aug. 20, 1984

[51] Int. Cl.⁴ ............................................. G21C 7/34
[52] U.S. Cl. .................................. 376/156; 376/191; 376/214; 376/364; 376/446
[58] Field of Search .............. 376/191, 214, 156, 364, 376/446

[56] References Cited

U.S. PATENT DOCUMENTS

| | | | |
|---|---|---|---|
| 2,872,399 | 2/1959 | Newson | 376/214 |
| 3,349,004 | 10/1967 | Lass et al. | |
| 3,741,868 | 6/1973 | Qurnelle et al. | |
| 3,770,583 | 11/1973 | Klumb et al. | |
| 3,801,734 | 4/1974 | West | 376/364 |
| 4,208,247 | 6/1980 | Impink, Jr. | 376/191 |
| 4,208,248 | 6/1980 | Jobsen | |
| 4,278,501 | 7/1981 | Steinke | |

FOREIGN PATENT DOCUMENTS

| | | | |
|---|---|---|---|
| 0063588 | 5/1977 | Japan | 376/156 |
| 0054692 | 5/1978 | Japan | 376/156 |
| 0077995 | 7/1978 | Japan | 376/191 |
| 891806 | 3/1962 | United Kingdom | 376/156 |

*Primary Examiner*—Harvey E. Behrend

[57] ABSTRACT

A secondary source positioning mechanism for a fuel assembly in a nuclear reactor locates an individual one of the secondary sources in a respective guide thimble of the fuel assembly aligned with an opening defined through the upper core plate which overlies the fuel assembly. The positioning mechansim has a tapered locating boss which registers with a chamfer on the lower side of the core plate about one of its openings and a resilient holddown device which resiliently couples the upper end of a rod containing the secondary source to the locating boss in a manner which restrains the upper end of the rod in the lateral direction and positions the secondary source rod in the axial direction.

8 Claims, 3 Drawing Figures

INDIVIDUAL SOURCE POSITIONING MECHANISM FOR A NUCLEAR REACTOR FUEL ASSEMBLY

BACKGROUND OF THE INVENTION

1. Field of the Invention

The present invention relates generally to a neutron source arrangement in a nuclear reactor for facilitating core startup and, more particularly, is concerned with a mechanism for individually positioning secondary sources in guide thimbles without requiring special modification of the fuel assembly and upper core support plate of the reactor in order to accomodate such arrangement.

2. Description of the Prior Art

A pressurized-water nuclear reactor (PWR) typically includes a large number of fuel assemblies each of which is composed of top and bottom nozzles with a plurality of elongated transversely spaced guide thimbles extending between the nozzles and a plurality of transverse grids axially spaced along the guide thimbles. Also, an organized array of elongated fuel rods are transversely spaced apart and supported by the grids between the top and bottom nozzles.

In addition to being structural elements of the fuel assembly, the guide thimbles provide channels for insertion of burnable poison rods, neutron absorber control rods, thimble plugs, and primary and secondary neutron source assembllies into the reactor core. The purpose of a neutron source assembly is to facilitate startup of the reactor core. The primary source spontaneously emits neutrons during initial core loading and reactor startup. After the primary source decays beyond the desired neutron flux level, neutrons are then supplied by the secondary source. It becomes the source of neutrons during periods of low neutron flow, such as during refueling and the subsequent startups.

Historically, in the case of standard PWR design, the reactor core employs four source assemblies: two primary source assemblies and two secondary source assemblies. Each primary source assembly contains one primary source rod and many burnable poison rods. Each secondary source assembly contains a symmetrical grouping of four secondary source rods and several burnable poison rods. The secondary source rods and poison rods are ganged together on, and suspended from, a spider located between the top nozzle and the upper core plate. The spider is held in positiion by a holddown spring which reacts with the upper core support plate.

However, in more recent advanced PWR design which requires secondary sources for reactor core startup, there is no room for a spider between the upper core support plate and the top nozzle. Consequently, a need exists for an alternative technique for positioning the secondary source rods in the guide thimbles other than by the use of a spider which would require significant modification of the fuel assembly and upper core support plate.

SUMMARY OF THE INVENTION

The present invention provides a secondary source positioning mechanism designed to satisfy the aforementioned needs. Uniquely, the positioning mechanism takes advantage of existing structural features of the upper core support plate to individually locate secondary source rods in lateral and axial directions. Specifically, the positioning mechanism includes a locating boss which registers against an existing chamfer on the lower side of the upper core plate and a spring actuated holddown device connected to the locating boss and coupled to the upper end of the secondary source rod so as to react against the upper core plate in positioning the upper end of the secondary source rod in the axial and lateral directions. Thus, the invention achieves its objective without requiring specific modifications to the fuel assembly and upper core plate.

Accordingly, the present invention is directed to a secondary source positioning mechanism for a fuel assembly in a nuclear reactor core where the fuel assembly includes top and bottom nozzles with a plurality of guide thimbles extending between and interconnecting the nozzles and an upper core plate positioned adjacent to and above the top nozzle. The upper core plate includes a multiplicity of flow openings to allow coolant to pass upwardly through the core, and at least some of these openings are aligned over the guide thimbles such that control rods and the like can pass down through the core plate and be inserted into some of the guide thimbles of the fuel assembly. Other vacant guide thimbles located near the edge of the core receive rods which contain the secondary sources.

The positioning mechanism of the present invention locates an individual one of the secondary source rods in a respective guide thimble aligned with an opening defined througgh the upper core plate. The opening has seating means defined about it on the lower side of the core plate. The positioning mechanism has locating means which registers against the core plate seating means and resilient holddown means coupling the source rod with the locating means in a manner which restrains the upper end in the lateral direction and positions the secondary source rod in the axial direction.

More particularly, the resilient holddown means includes an outer spring retainer which is attached to the upper end of the secondary source rod and has an outwardly projecting ledge which rests on an upper portion of the guide thimble. An inner spring guide retainer, is connected at its upper end to the locating means, and at its lower end slides relative to the outer spring retainer. Finally, a holddown means encircles the inner spring retainer and extends downwardly within the outer spring retainer so as to abut an internal annular ledge of the outer retainer and assume a preloaded state against the lower side of the locating means. In such state, the holddown spring pushes downwardly on the outer retainer and the secondary source rod and upwardly on the locating means. Thus, the source rod is held down by the spring reacting against the upper core plate.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
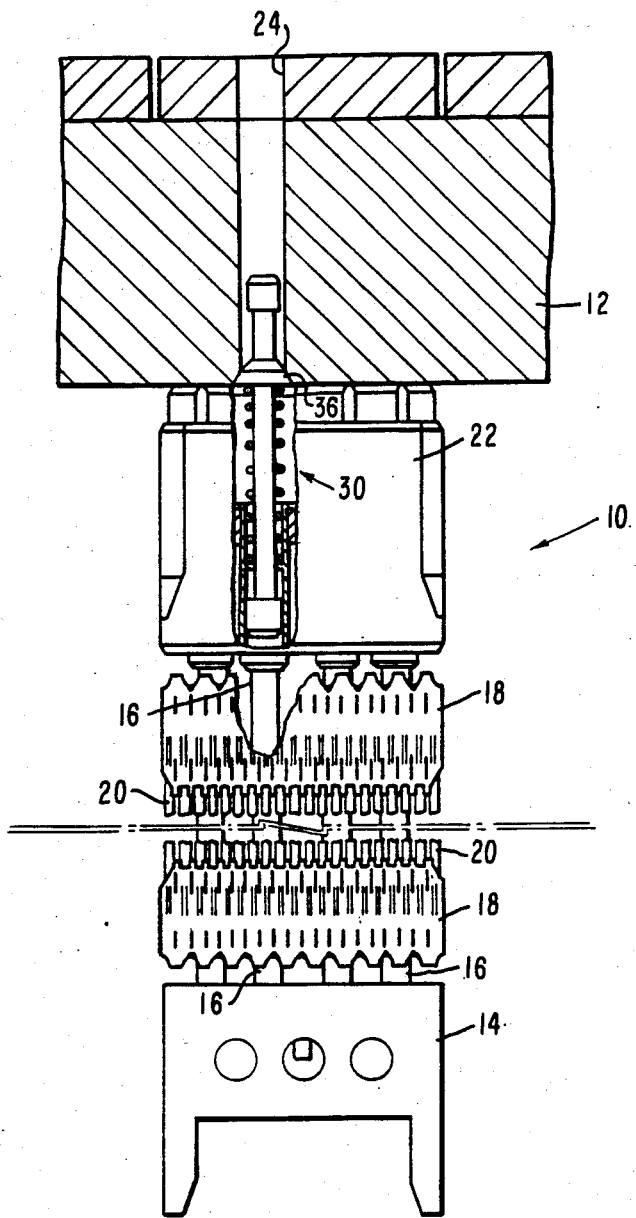
FIG. 1 is an elevational view of a fuel assembly and of a portion of an upper core support plate, shown in cross-sectional form, extending across the top of the fuel assembly. The fuel assembly is illustrated in vertically foreshortened form with parts thereof and of the core plate broken away to expose the individual source positioning mechanism of the present invention associated with one of the secondary source rods positioned in a respective guide thimble of the fuel assembly and aligned with an opening through the upper core plate.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to tbe construed as limiting terms.

IN GENERAL

Referring now to the drawings, and particularly to FIG. 1, there is shown an overall combination of a fuel assembly, generally designated by the numeral 10, and an upper core plate 12 disposed above and extending across the top of the fuel assembly 10.

The fuel assembly 10, being shown in vertically foreshortened form in FIG. 1, basically includes a lower end structure or bottom nozzle 14 for supporting the assembly on a lower core plate (not shown) in the core region of a reactor (not shown), and a number of longitudinally extending guide tubes or thimbles 16 which project upwardly from the bottom nozzle 14. The assembly 10 further includes a plurality of transverse grids 18 axially spaced along the guide thimbles 16 and an organized array of elongated fuel rods 20 transversely spaced and supported by the grids 20. Finally, the assembly 10 has an upper end structure or top nozzle 22 attached to the upper ends of the guide thimbles 16. With such arrangement of parts, the fuel assembly 10 forms an integral unit capable of being conventionally handled without damaging the assembly parts.

The upper core support plate 12, being conventional, extends across the top of the fuel assembly 10 as well as across the top of other identical fuel assemblies (not shown) arranged within the core. The core plate 12 has a multiplicity of flow openings 24 (only one of which is shown in FIG. 1) to allow coolant to pass upwardly through the core. At least some of these openings are aligned over the guide thimbles 16 such that the control rods (not shown) can pass down through the core plate 12 and be inserted into the guide thimbles 16 of the fuel assembly 10.

INDIVIDUAL SOURCE POSITIONING MECHANISM

In addition to receiving control rods which are used to regulate the power level of the reactor, the guide thimbles provide channels for insertion of neutron sources into the reactor core. Especially, certain of the guide thimbles 16 located near the edge of the core receive rods 26 which contain secondary sources 28. Typically, the sources 28 are in the form of a stack of antimony-beryllium pellets contained within an elongated rod. As is conventionally known, the purposes of the sources 28 is to facilitate startup of the reactor core.

Figure 2:
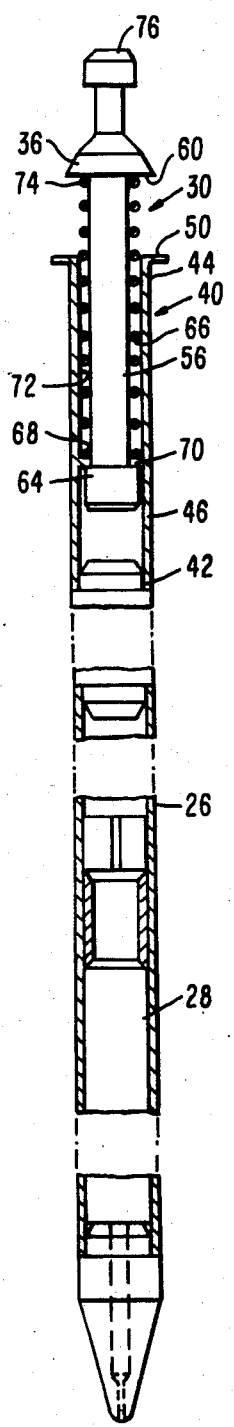
FIG. 2 is an enlarged, fragmentary sectional view of one of the secondary source rods and associated positioning mechanism of the present invention removed from the assembly shown in FIG. 1.
Figure 3:
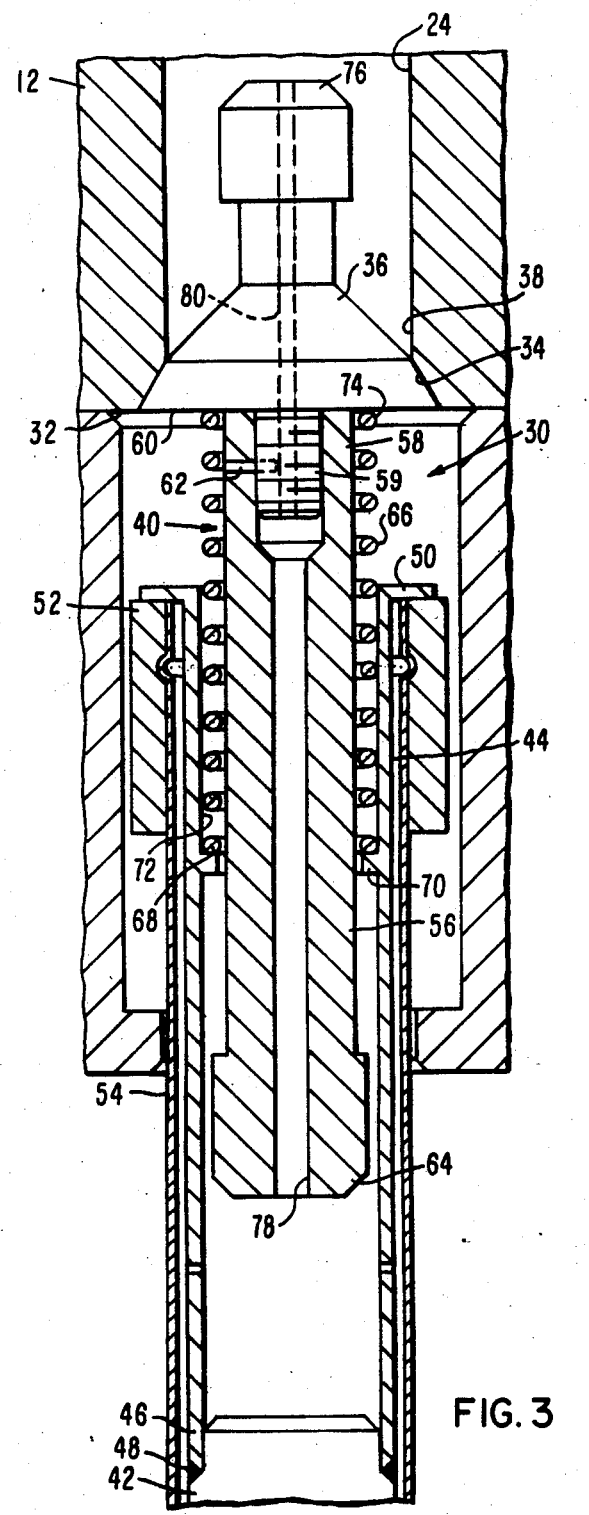
FIG. 3 is an enlarged, fragmentary sectional view of the individual source positioning mechanism of FIG. 1 shown connected to the upper end of the one secondary source rod.

Referring now to FIGS. 2 and 3 in addition to FIG. 1, the present invention concerns a mechanism, generally designated 30, for positioning an individual source rod 26 in a respective guide thimble 16 of the fuel assembly 10. About the one coolant flow opening 24, the core plate 12 at its lower side 32 has a chamfer 34 against which the mechanism 30 seats as will be explained below.

Basically, the positioning mechanism 30 has locating means in the form of a tapered or conical-shaped boss 36 which registers against the core plate seating chamfer 34 and extends within the opening 24 from the lower end 38 thereof, and resilient holddown means 40 which couples the upper end 42 of the secondary source rod 26 with the locating boss 36 in a manner which resiliently restrains the upper source rod end 42 in the lateral direction and positions the rod 26 in the axial direction.

The resilient holddown means 40 includes an outer spring retainer 44 which has a tubular shape and is attached at its lower end 46 by a girth weld 48 to the upper end plug 42 of the source rod 26. At its upper end, the outer retainer 44 has an outwardly projecting ledge 50 which overlies and rests on a nozzle expansion collar 52 which is part of the upper extension 54 of the guide thimble 16.

Additionally, the holddown means 40 includes an inner spring guide retainer 56 which is internally threaded at its upper end 58 where it is connected to an externally threaded mounting pin 59 fixed to and depending downwardly from the underside 60 of the locating boss 36. As seen in FIG. 3, a lock pin 62 also extends transversely through the threaded connection of the retainer upper end 58 and the mounting pin 59. The inner retainer 56 which is cylindrical in shape extends downwardly within the outer retainer 44 and has a lower end 64 with a diameter larger than the diameter of the rest of the inner retainer.

Finally, the holddown means 40 includes a holddown coil spring 66 which fits between the outer retainer 44 and the inner retainer 56. The holddown spring 66 rests at its lower end 68 on an annular ledge 70 formed on the internal wall 72 of the outer retainer 44 about a quarter of the distance down the length of the outer retainer from its upper ledge 50. The spring 66 encircles the inner retainer 56 and at its upper end 74 abuts the underside 60 of the locating boss 36. In its normal condition, the holddown spring 66 is in a state of compression in which it is preloaded against the underside of the boss 36. In such state, the spring 66 pushes downwardly on the outer retainer 44 and thereby the secondary source rod 26 and pushes upwardly on the locating boss 36. Therefore, the source rod 26 is held down by the spring 66 reacting against the upper core support plate 12 through the locating boss 36. The spring is designed to provide sufficient force to hold the source rod 26 against upwardly hydraulic flow forces and to compensate for variations in length of the guide thimble due to thermal growth and irradiation growth. Axial movement can be accommodated by the holddown means 40 of the positioning mechanism 30 since the outer retainer 44 is movable relative to the inner retainer 56.

At its upper end, the positioning mechanism 30 has a handling fitting 76 which connects to the top of the locating boss 36 and extends upwardly in the flow opening 24. The fitting 76 can be grasped by a handling tool (not shown) using conventional techniques. Coolant flow out of the guide thimble 16 is vented upward by a central bore 78 in the inner retainer 56 which communicates with a passageway 80 extending through the mounting pin 59, boss 36 and handling fitting 76.

Thus, it is readily apparent that the disclosed arrangement of the positioning mechanism 30 with the guide thimble 16 and upper core plate 12 provides effective, resilient holddown forces for restraining the upper end of the source rod 26 in the lateral direction transverse to the axis of the rod and for positioning the source rod 26 in the axial direction. Furthermore, the arrangement is provided without any modification being required to the fuel assembly 10 or to the upper core support plate 12.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear reactor including a fuel assembly, at least one elongated neutron source rod and an upper core plate, said fuel assembly having top and bottom nozzles with a plurality of guide thimbles extending between and interconnecting said nozzles, said upper core plate being positioned adjacent to and above said top nozzle of said fuel assembly and having a multiplicity of flow openings therethrough to allow passage of coolant from said fuel assembly, at least some of said openings being aligned over respective ones of said guide thimbles with seating means defined about said openings on a lower side of said core plate, a separate mechanism for positioning each individual neutron source rod in a respective guide thimble aligned with one of said openings defined through said upper core plate, comprising:
   (a) locating means registering against said core plate seating means; and
   (b) resilient holddown means extending at least partially into said guide thimble and coupling said source rod with said locating means in a manner which restrains said source rod in a lateral direction and positions said rod in a stationary axial relationship within said guide thimble.

2. The positioning mechanism as recited in claim 1, wherein said locating means comprises a tapered boss which fits against said seating means and extends into said opening.

3. The positioning mechanism as recited in claim 2, further comprising a handling fitting which connects to said boss and extends upwardly therefrom in said opening.

4. The positioning mechanism as recited in claim 2, wherein said resilient holddown means includes:
   an outer spring retainer connected at a lower end to said source rod and having means at an upper end engaged with said guide thimble so as to retain said outer spring retainer in a generally stationary axial relationship in said guide thimble;
   an inner spring retainer connected at an upper end to said locating means and extending within said outer spring retainer; and
   a holddown spring extending between said source rod and said locating means and encircling said inner retainer and disposed between said inner and outer retainers, said spring further at its lower end being seated in a stationary relationship to said outer retainer and at an upper end abutting said locating means so as to assume a preloaded state in which said spring pushes downwardly on said source rod and upwardly on said locating means, whereby said source rod is held in position by said spring reacting against said upper core plate.

5. The positioning mechanism as recited in claim 4, wherein said inner retainer and locating means have passageways defined therethrough for allowing venting of coolant flowing upward in said guide thimble.

6. The positioning mechanism as recited in claim 5, wherein said locating means comprises a tapered boss which fits against said seating means and extends into said opening.

7. The positioning mechanism as recited in claim 6, further comprising:
   a handling fitting which connects to said boss and extends upwardly therefrom in said opening.

8. In a nuclear reactor including a fuel assembly, at least one elongated neutron source rod and an upper core plate, said fuel assembly having top and bottom nozzles with a plurality of guide thimbles extending between and interconnecting said nozzles, said upper core plate being positioned adjacent to and above said top nozzle of said fuel assembly and having a multiplicity of flow openings therethrough to allow passage of coolant from said fuel assembly, at least some of said openings being aligned over respective ones of said guide thimbles with seating means defined about said openings on a lower side of said core plate, a separate mechanism for positioning each individual neutron source rod in a respective guide thimble aligned with one of said openings defined through said upper core plate, comprising:
   (a) locating means registering against said core plate seating means; and
   (b) resilient holddown means extending at least partially into said guide thimble and coupling said source rod with said locating means in a manner which restrains said source rod in a lateral direction and positions said rod in a stationary axial relationship within said guide thimble, said resilient holddown means including
      (i) an outer spring retainer connected at a lower end to said source rod and having means at an upper end engaged with said guide thimble so as to retain said outer spring retainer in a generally stationary axial relationship in said guide thimble,
      (ii) an inner spring retainer connected at an upper end to said locating means and extending within said outer spring retainer, and
      (iii) a holddown spring extending between said source rod and said locating means and encircling said inner retainer and disposed between said inner and outer retainers, said spring further at its lower end being seated in a stationary relationship to said outer retainer and at an upper end abutting said locating means so as to assume a preloaded state in which said spring pushes downwardly on said source rod and upwardly on said locating means, whereby said source rod is held in position by said spring reacting against said upper core plate.

* * * * *